United States Patent [19]
Miyazaki et al.

[11] Patent Number: 4,883,310
[45] Date of Patent: Nov. 28, 1989

[54] ROOF STRUCTURE FOR MODULAR VEHICLE BODY

[75] Inventors: Kenichi Miyazaki, Sagamihara; Tadahiko Morigaki, Hatano, both of Japan

[73] Assignee: Nissan Motor Co., Ltd., Yokohama, Japan

[21] Appl. No.: 173,402

[22] Filed: Mar. 25, 1988

[30] Foreign Application Priority Data

Mar. 26, 1987 [JP] Japan .................................. 62-70484

[51] Int. Cl.⁴ ............................................. B60D 25/06
[52] U.S. Cl. ......................................... 296/210; 29/469
[58] Field of Search ....................... 296/197, 210, 216; 29/469, 509, 522

[56] References Cited

U.S. PATENT DOCUMENTS

| 2,072,842 | 3/1937 | Trautvetter | 296/210 |
| 2,425,948 | 5/1944 | Lucien | 180/11 |
| 2,988,397 | 6/1961 | Brueder | 296/28 |
| 3,021,172 | 2/1962 | Fiala et al. | 296/28 |
| 3,326,599 | 6/1967 | Pashenee | 296/210 |
| 3,541,668 | 11/1970 | Wessells, III et al. | 29/469 |
| 3,827,137 | 8/1974 | Schubach | 29/469 |
| 4,422,685 | 12/1983 | Bonfilio et al. | 296/197 |
| 4,634,173 | 1/1987 | Aonuma et al. | 296/188 |

FOREIGN PATENT DOCUMENTS

| 75754 | 4/1983 | European Pat. Off. . |
| 76934 | 4/1983 | European Pat. Off. . |
| 142581 | 5/1985 | European Pat. Off. . |
| 188837 | 7/1986 | European Pat. Off. . |
| 193499 | 9/1986 | European Pat. Off. . |
| 199970 | 12/1986 | European Pat. Off. . |
| 203484 | 12/1986 | European Pat. Off. . |
| 240470 | 10/1987 | European Pat. Off. . |
| 55-36117 | 3/1980 | Japan . |
| 59-114165 | 7/1984 | Japan . |
| 805024 | 11/1958 | United Kingdom . |
| 1488793 | 10/1977 | United Kingdom . |
| 2115753 | 9/1983 | United Kingdom . |
| 2150088 | 6/1985 | United Kingdom . |
| WO85/05605 | 12/1985 | World Int. Prop. O. . |
| WO87/03846 | 7/1987 | World Int. Prop. O. . |

Primary Examiner—Joseph F. Peters, Jr.
Assistant Examiner—Jesús Sotelo
Attorney, Agent, or Firm—Foley & Lardner, Schwartz, Jeffery, Schwaab, Mack, Blumenthal & Evans

[57] ABSTRACT

A roof structure consists of roof rail assembly and a roof assembly. The roof rail assembly is constituted by a pair of roof side rails of body side assemblies and front and rear roof rails interconnecting the roof side rails. The roof rail assembly has a plurality of joining surfaces which are nearly flush with and extend consecutively from each other. The roof assembly includes a roof panel and a joining surface at the periphery of the roof panel. The joining surface of the roof assembly is lapped on the joining surfaces of the roof rail assembly and is fastened to same with bolts and nuts while being bonded to same with a sealant adhesive interposed between the joining surface of the roof assembly and the joining surfaces of the roof rail assembly. Some of the bolts have head portions disposed outside of the roof panel and the roof side rail. A moulding is utilized to cover the head portions of the bolts. A sill cover and a rear fender outer are adapted to be fastened to the roof side rail simultaneously with the fastening of the roof side rail and the roof panel.

13 Claims, 3 Drawing Sheets

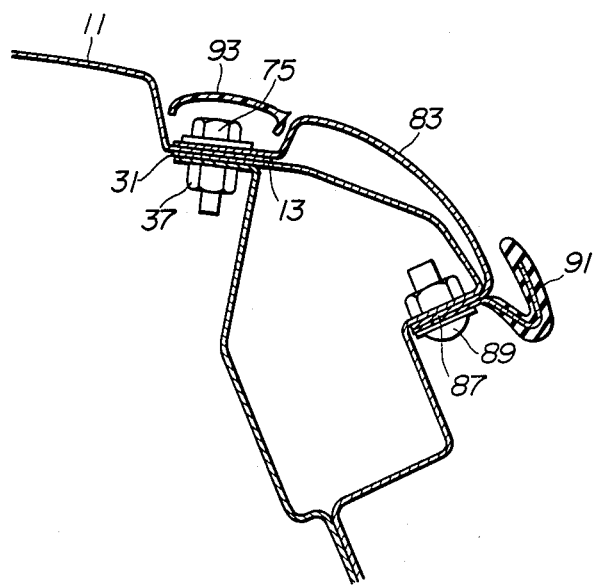
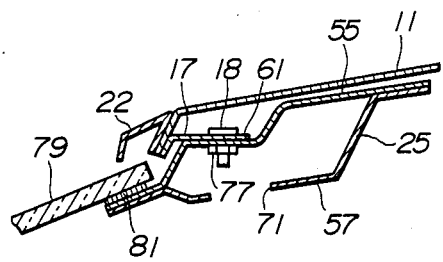
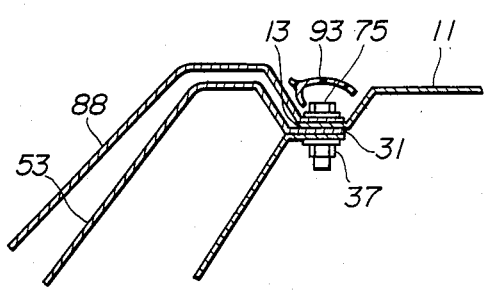

ROOF STRUCTURE FOR MODULAR VEHICLE BODY

BACKGROUND OF THE INVENTION

1. Field of the Invention

The present invention relates in general to a modular vehicle body and more particularly to a roof structure for a modular vehicle body.

2. Description of the Prior Art

Unitized bodies have been used for many of automobiles, particularly for most passenger cars. The unitized bodies however have a difficulty in installation of components and inspection of same since access to the spaces for disposition of the components is obstructed by the body section enclosing the spaces. For example, installation of some devices, components for upholsteries requires a worker to get into a vehicle cabin or to get his hands into a vehicle cabin through an opening of a vehicle body, resulting in the necessity of an awkward, difficult and time-consuming work and therefore an expensive assembly work.

A roof structure of a modular vehicle body has a problem how to increase the assembling efficiency and to improve the appearance.

SUMMARY OF THE INVENTION

In accordance with the present invention, there is provided a novel roof structure for a modular vehicle body.

The roof structure comprises roof rail means having a plurality of joining surfaces which are nearly flush with and extend consecutively from each other, a sealant adhesive applied to the joining surfaces of the roof rail means, a roof assembly having at the periphery thereof a joining surface lapped on the joining surface of the roof rail means with the sealant adhesive being interposed therebetween, and mechanical fastening means for mechanically fastening the joining surface of the roof assembly to the joining surfaces of the roof rail means.

In one form of the invention, the roof assembly comprises a roof panel which has an end portion consisting of a depending wall and a substantially horizontal flange extending outwardly from the lower end of the depending wall. The horizontal flange has an inside surface which constitutes part of the joining surface of the roof assembly. The roof rail means comprises a flange on which the flange of the roof panel is lapped. The flange of the roof rail means has an outside surface which constitutes part of the joining surfaces of the roof rail means. The mechanical fastening means comprises a plurality of bolts and nuts. The flange of the roof rail means has an inside surface to which the nuts are secured. The bolts are screwed into the nuts in such a manner as to have bolt heads disposed outside of the roof panel and the roof side rail. The roof assembly further comprises a moulding extending between the roof panel and the roof side rail to cover the bolt heads.

The above structure is quite effective for solving the above noted problems inherent in the prior art vehicle bodies.

It is accordingly an object of the present invention to provide a novel roof structure for a modular vehicle body which can be assembled with ease and efficiency without deteriorating the appearance.

It is another object of the present invention to provide a novel roof structure which can attain an assured seal thereof with ease and efficiency.

It is a further object of the present invention to provide a novel roof structure which is suited for manufacture and assembly using robots.

It is a further object of the present invention to provide a novel roof structure which is particularly suited for a modular vehicle body.

It is a further object of the present invention to provide a novel roof structure which makes it possible to attain various types of vehicles with ease and efficiency.

BRIEF DESCRIPTION OF THE DRAWINGS

FIG. 4 is a sectional view taken along the line IV—IV of FIG. 3;

FIG. 5 is a sectional view taken along the line V—V of FIG. 3; and

FIG. 6 is a sectional view taken along the line VI—VI of FIG. 3.

DETAILED DESCRIPTION OF THE PREFERRED EMBODIMENT

Figure 1:
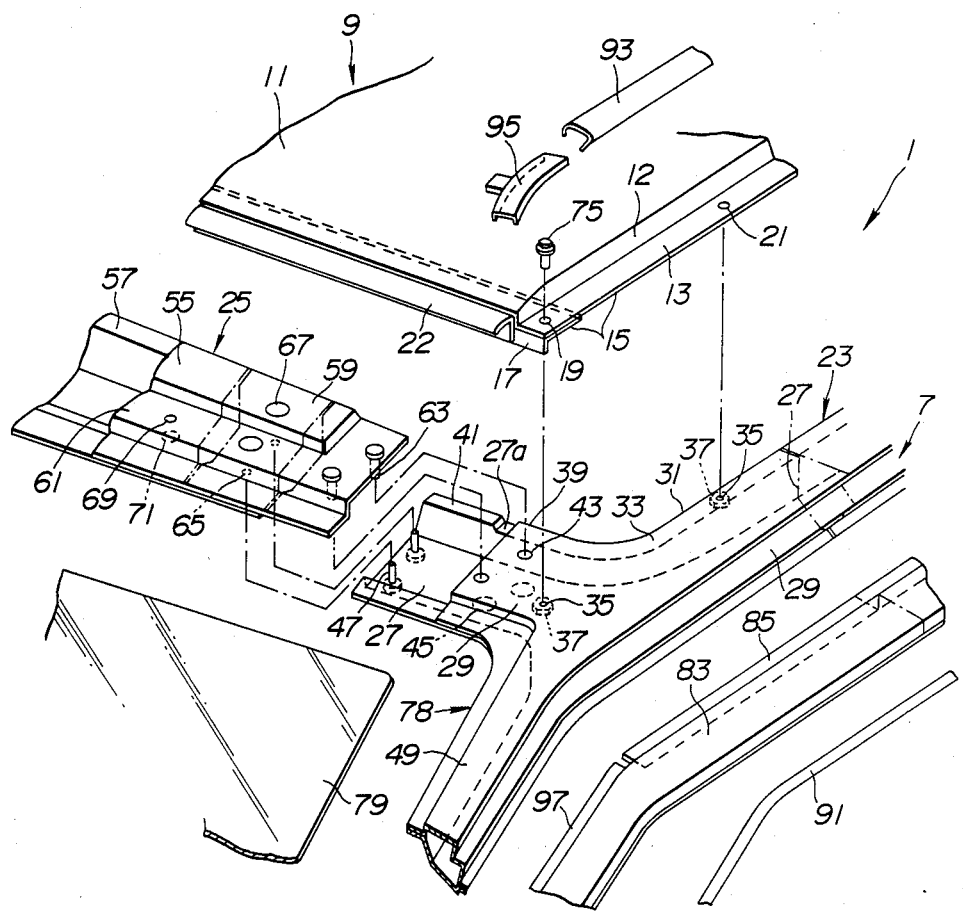
FIG. 1 is an exploded perspective view of a principal portion of a roof structure according to an embodiment of the present invention.
Figure 2:
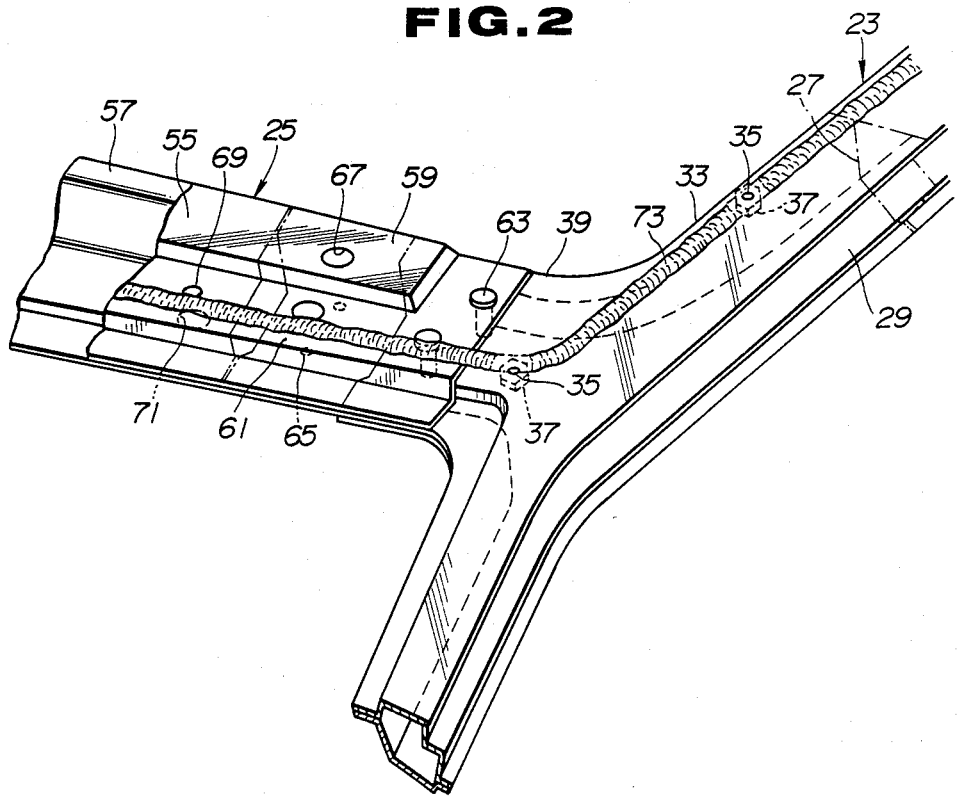
FIG. 2 is a perspective view of a roof side rail and a front roof rail of the roof structure of FIG. 1.
Figure 3:
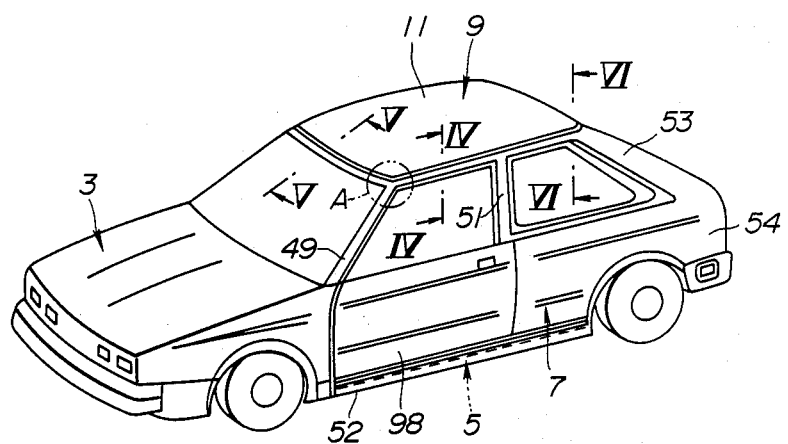
FIG. 3 is a perspective view of a vehicle having a modular vehicle body structure.

Referring to FIGS. 1 to 6, a roof structure of this invention is embodied in a 2-door sedan hatchback type vehicle shown in FIG. 3 for the purpose of illustration only. FIG. 1 is an enlarged, exploded perspective view of the portion "A" of FIG. 3. FIG. 2 shows a partly assembled state of the roof structure of FIG. 1.

A vehicle body 1 shown in FIG. 3 is a modular vehicle body and consists of an engine compartment assembly 3, floor assembly 5, a pair of body side assemblies though only one 7 is shown, and a roof assembly 9. The assemblies are fastened together with bolts and nuts.

The roof assembly 9 mainly consists of a roof panel 11. The roof panel 11 has at each laterally opposed ends thereof a depending wall 12 and a horizontal flange 13 projecting outwardly from the lower end of the depending wall 12. The horizontal flange 13 is enlongated in the fore-and-aft direction of the vehicle body. The inside surface of each horizontal flange 13 is adapted to constitute part of a joining surface 15 of the roof panel 11.

The roof panel 11 is provided with a retainer 17 which is secured to the front end inside surface thereof to project rearwardly therefrom. The retainer 17 is also secured at each laterally opposed end thereof to the front end of the horizontal flange 13. The inside surface of the retainer 17 constitutes part of the joining surface 15 of the roof panel 11. A plurality of bolts 18 are secured to the retainer 17 in such a manner as to project downwardly from the inside surface thereof.

The front end portion of the flange 13 and the lateral end portion of the retainer 17 which are lapped one upon another are formed with a bolt hole 19 extending therethrough. The flange 13 is also formed with bolt holes 21 arranged at a predetermined interval in the fore-and-aft direction of the vehicle body though only one is shown.

The rear end of the roof panel 11 is provided with a retainer (not shown) similarly to the front end thereof.

Each body side assembly 7 has a roof side rail 23. The roof side rails 23 are interconnected at the front ends by a front roof rail 25 and at the rear ends by a rear roof rail (not shown).

The roof side rail 23 consists of a roof side rail inner 27 and a roof side rail outer 29 which are joined together to have a box-like closed section. The roof side rail 23 has a joining flange 31 at which the roof side rail inner 27 and the roof side rail outer 29 are joined together. The joining flange 31 has on the outside thereof a joining surface 33 extending in the fore-and-aft direction of the vehicle body. The joining surface 33, as shown in FIG. 1, is formed with holes 35 which are aligned with the bolt holes 19 and 21 of the roof assembly 9. Nuts 37 are welded to the inside surface of the flange 31 in such a way as to be aligned with the holes 35, respectively. The roof side rail 23 has at the front end thereof a joining portion 39 projecting laterally inwardly therefrom for joining with the front roof rail 25. The joining portion 39 is constituted by extensions of the roof side rail inner 27 and the roof side rail outer 29 extending laterally inwardly of the vehicle body, which extension of the roof side rail inner 27 is a little longer than the extension of the roof side rail outer 29. The extension of the roof side rail inner 27 is formed at its inner flange 27a with an emboss 41. The extension of the roof side rail outer 29 is formed with bolt holes 43. The roof side rail inner 27 is formed with access holes 45 which are aligned with the bolt holes 43. The extension of the roof side rail inner 27 is provided with bolts 47 secured thereto and extending upwardly therefrom.

A front pillar 49 extends consecutively from the front end of the roof side rail 23. A center pillar 51 and a rear pillar 53 extends consecutively and integrally from the rearward part of the roof side rail 23. The roof side rail 23, front pillar 49, center pillar 51 and the rear pillar 53 constitute the body side assembly 7. The body side assembly 7 further includes a side sill 52 and a rear fender 54 integrally and is equipped with upholsteries as trim members to constitute an independent section for the modular vehicle body.

The front roof rail 25, as shown in FIGS. 1 and 5, consists of a front roof rail upper 55 and a front roof rail lower 57 which are welded together to constitute a box-like closed section. The laterally opposed ends of the front roof rail 25 are so structured that the front roof rail upper 55 projects laterally more outward than the front roof rail lower 57. The front roof rail upper 55 has a stepped outer surface including a higher rear surface portion 59 and a lower front surface portion 61. The lower surface portion 61 is substantially horizontal. Bolts 63 are secured to each lateral end portions of the front roof rail upper 55 to project downwardly therefrom. Each lateral end portion of the front roof rail lower 57 is formed with bolt holes 65. The front roof rail upper 55 is formed with access holes 67 which are aligned with the bolt holes 65. The front roof rail upper 55 is further formed with bolt holes 69 which are aligned with the bolts 18 of the roof assembly 9. The front roof rail lower 57 is formed with access holes 71 which are aligned with the bolt holes 69.

Each lateral end of the front roof rail 25 is matched with the joining portion 39 at the front end of the roof side rail 23, allowing the bolts 63 to be inserted into the bolt holes 43 while at the same time the bolts 47 to be inserted into the bolt holes 65. Nuts (not shown) are then screwed onto the bolts 47 and 63 by access thereto through the access holes 45 and 67 and tightened to secure each lateral end of the front roof rail 25 to the joining portion 39 at the front end of the roof side rail 23.

By the above connection, the front roof rail upper 55 and the front roof rail lower 57 are respectively matched with the roof side rail outer 29 and the roof side rail inner 27 at the joining portion 39 to form such a structure shown in FIG. 2 and in which the joining surface 33 of the roof side rail 23 is substantially flush with and extends consecutively from the attaching surface 61 of the front roof rail 25.

The emboss 41 at the joining portion 39 is adapted to contact the inside surface of the front roof rail 25 at a portion opposite to a lateral end of the higher rear surface portion 59 thereof for thereby locating the front roof rail 25 relative to the roof side rail 23. Though not shown, the rear roof rail is joined at each lateral end with the rear ends of the roof side rails 23 in the manner similar to that described as above with respect to the front roof rail 25.

After the roof side rail 23 and the front roof rail 25 are joined together in the above mentioned manner to make the joining surfaces 33 and 61 nearly flush with and extend consecutively from each other, sealing adhesive 73 is applied to the joining surfaces 33 and 61. Thereafter, the joining surface 15 of the roof assembly 9 is placed on the joining surfaces 33 and 61. Bolts 75 are screwed into the nuts 37 through the bolt holes 19 and 21 for thereby fastening each flange 13 to each roof side rail 23. In this instance, the bolts 75 have bolt heads disposed outside of the roof panel 11 and the roof side rail 23.

As shown in FIG. 5, the retainer 17 has bolts 18 welded thereto and projecting downwardly therefrom. In assembly, the bolts 18 are inserted into the bolt holes 56 whilst the nuts 77 is screwed onto the bolts 18 by access thereto through the access holes 71, whereby to fasten the roof assembly 9 to the front roof rail 25.

The roof assembly 9 is fastened at the rear end portion of each flange 13 to the rear end portion of the joining surface 33 with bolts 75 and nuts 37 as shown in FIG. 6. Though not shown, the rear end of the roof assembly 9 is fastened with bolts and nuts to the rear roof rail in the manner similar to that described with reference to the front end of the roof assembly 9. A windshield glass 79 is bonded with a sealant adhesive 81 to a windshield frame 78 constituted by the front roof rail 25, front pillars 49, etc. as shown in FIG. 5.

The front pillar 49 and the roof side rail 23 are covered by a pillar cover 83. The pillar cover 83 is fastened at a flange 85 to the flange 13 of the roof assembly 9 and the flange 31 of the roof side rail 23 with the bolts 75 and the nuts 37 and at an opposite flange 87 to the outside surface of the roof side rail 23 together with a roof drip moulding 91 with bolts 89 and nuts 90 as shown in FIG. 4. The pillar cover 83 is fastened to the front pillar 49 in the similar manner as above. The outer surface of the rear pillar 53 is covered by a rear fender outer 88. The rear pillar 53 and the rear fender outer 88 are fastened at the upper flanges thereof to the flanges 13 and 31 with the bolts 75 and nuts 37.

The head portions of the bolts 75 are covered by a moulding 93 extending between the roof panel 11 and the pillar cover 83 and between the roof panel 11 and the rear fender outer 88. The moulding 93 is connected through a moulding joint 95 shown in FIG. 1 to a moulding 97 extending between the front pillar 49 and the windshield glass 79. The moulding joint 95 is also connected to a moulding 22 at the front end of the roof panel 11. The moulding 22 is secured to the front end of the roof panel 11 to project forwardly therefrom to cover an upper end portion of the windshield glass 79.

The engine compartment assembly 3 is equipped with, prior to being joined with other assemblies, a power unit, front suspension, etc. so as to constitute an engine compartment module. The floor assembly 5 mainly consists of a floor panel and is equipped with seats, suspensions, etc. so as to constitute a floor module.

The roof structure described above is assembled in the following manner.

The engine compartment assembly 3, floor assembly 5, body side assemblies 7 and the roof assembly 9 are prepared independently, i.e., fabricated and assembled independently. The assemblies are then painted and equipped with devices, components and upholsteries, independently so as to constitute independent vehicle sections, i.e., vehicle modules. In this instance, it is to be noted that automatic vehicle assembly using robots can be attained with ease in case of the above described modular vehicle structure since the assemblies are accessible from all sides thereof in order to perform installation and inspection of devices, components, upholsteries, etc. thereof.

The engine compartment assembly 3 and the floor assembly 5 are first fastened together and then joined with the roof side assemblies 7. The front roof rail 25 is fastened to the joining portion 39 at the front end of the roof side rail 23 in the above described manner while at the same time the rear roof rail, though not shown, is fastened to the rear ends of the roof side rails 23. The windshield glass 79 is secured to the windshield frame 78.

The sealant adhesive 73 is applied, as shown in FIG. 2, to the joining surfaces 33 and 61 which are arranged to be nearly flush with and extend continuously from each other when the roof side rail 23 and the front roof rail 25 are joined together. In this instance, the sealant adhesive 73 does not flow out of place but held in place stationarily since the joining surfaces 33 and 61 are substantially horizontal. The joining surface 15 of the roof assembly 9 is then placed on the joining surfaces 33 and 61 to be fastened to same, whereby not only installation but also sealing of the roof assembly 9 is attained at the same time, thus making it possible to attain installation of the roof assembly 8 with ease and efficiency. In this connection, it will be understood that in installation of the roof assembly 9 there is no possibility of spattering of sealant adhesive on the surface of the roof panel, etc. since there is no need of applying sealant adhesive after installation of the roof assembly 9 but the sealant adhesive is applied prior to installation of the roof assembly 9 and further since there is no need of using a seal gun which is liable to spatter sealant adhesive on the roof panel 11, thus making the assembly work more efficient and easier. It will be further understood that the roof structure of this invention can attain an assured seal thereof since the sealing is adapted to be performed on the smoothly consecutive surfaces 33 and 61.

The pillar cover 83 and the rear fender outer 88 are installed in place simultaneously with the fastening of the roof assembly 9 and the roof side rail 23. Thereafter, the moulding 93 and 97 which are connected by the moulding joint 95 is installed. Doors 98 and a hatchback door (not shown) are installed later.

From the foregoing, it will be understood that the roof structure of this invention makes it possible to attain various kinds of vehicles with ease and efficiency since the roof assembly is replaceable with another kind.

While the present invention has been described and shown as being applied to a modular vehicle body consisting of a plurality of vehicle modules, this is not limitative but it may be applied to, for example, a vehicle body in which only a roof is modularized.

It will be further understood that the present invention is not limited to a vehicle of a 2-door sedan hatchback type but can be applied to various types other than the type shown.

What is claimed is:

1. A roof structure for a vehicle body comprising:
   roof rail means having a plurality of joining surfaces which are nearly flush with and extend consecutively from each other;
   a sealant adhesive applied to said joining surfaces of said roof rail means;
   a roof assembly having at the periphery thereof a joining surface lapped on said joining surface of said roof rail means with said sealant adhesive being interposed therebetween; and
   mechanical fastening means for mechanically fastening said joining surface of said roof assembly to said joining surfaces of said roof rail means;
   wherein said roof assembly includes a roof panel with a front end, said roof assembly further having a moulding secured to said front end of said roof panel to cover an upper end portion of a windshield glass.

2. A roof structure as set forth in claim 1 wherein said front end of said roof panel comprises a depending wall and a substantially horizontal flange extending outwardly from the lower end of said depending wall, said horizontal flange having an inside surface which constitutes part of said joining surface of said roof assembly.

3. A roof structure as set forth in claim 2 wherein said roof rail means comprises a flange on which said flange of said roof panel is lapped, said flange of said roof rail means having an outside surface which constitutes part of said joining surfaces of said roof rail means, said mechanical fastening means comprising a plurality of bolts and nuts, said flange of said roof rail means having an inside surface to which said nuts are secured, said bolts being screwed into said nuts in such a manner as to have bolt heads disposed outside of said roof panel and said roof rail means.

4. A roof structure as set forth in claim 3 wherein said roof assembly further comprises a moulding extending between said roof panel and said roof rail means to cover said bolt heads.

5. A roof structure as set forth in claim 4 wherein said roof rail means further comprises a pillar cover having a flange lapped on said flange of said roof panel and is fastened to said roof panel and said roof rail means with said bolts and nuts.

6. A roof structure as set forth in claim 4 wherein said roof rail means further comprises a rear outer fender having a flange lapped on said flange of said roof panel and is fastened to said roof panel and said roof rail means with said bolts and nuts.

7. A roof structure as set forth in claim 2 wherein said roof panel has another end portion, said roof assembly further comprising a retainer secured to said another end portion of said roof panel to project inwardly therefrom, said retainer having an inside surface constituting part of said joining surface of said roof assembly, said retainer being elongated and having a longitudinal end portion, said flange of said roof panel being elongated and having a longitudinal end portion to which said longitudinal end portion of said retainer is secured.

8. A roof structure as set forth in claim 1 wherein said roof rail means comprises a pair of roof side rails, a front roof rail interconnecting the front ends of said roof side rails and a rear roof rail interconnecting the rear ends of said roof side rails.

9. A roof structure as set forth in claim 8 wherein said front roof rail constitutes part of a windshield frame for supporting thereon said windshield glass.

10. A roof structure for a vehicle body comprising:
roof rail means having a plurality of joining surfaces which are nearly flush with and extend consecutively from each other;
a sealant adhesive applied to said joining surfaces of said roof rail means;
a roof assembly having at the periphery thereof a joining surface lapped on said joining surface of said roof rail means with said sealant adhesive being interposed therebetween; and
mechanical fastening means for mechanically fastening said joining surface of said roof assembly to said joining surfaces of said roof rail means;
wherein said roof assembly comprises a roof panel which has a front end portion comprising a depending wall and a substantially horizontal flange extending outwardly from the lower end of said depending wall, said horizontal flange having an inside surface which constitutes part of said joining surface of said roof assembly;
wherein said roof rail means comprises a flange on which said flange of said roof panel is lapped, said flange of said roof rail means having an outside surface which constitutes part of said joining surfaces of said roof rail means, said mechanical fastening means comprising a plurality of bolts and nuts, said flange of said roof rail means having an inside surface to which said nuts are secured, said bolts being screwed into said nuts in such a manner as to have bolt heads disposed outside of said roof panel and said roof rail means; and
wherein said roof assembly further comprises a moulding extending between said roof panel and said roof rail means to cover said bolt heads.

11. A roof structure as set forth in claim 10, wherein said roof rail means further comprises a pillar cover having a flange lapped on said flange of said roof panel and fastened to said roof panel and said roof rail means with said bolts and nuts.

12. A roof structure as set forth in claim 10, wherein said roof rail means further comprises a rear outer fender having a flange lapped on said flange of said roof panel and fastened to said roof panel and said roof rail means with said bolts and nuts.

13. A roof structure for a vehicle body comprising:
roof rail means having a plurality of joining surfaces which are nearly flush with and extend consecutively from each other;
a sealant adhesive applied to said joining surfaces of said roof rail means;
a roof assembly having at the periphery thereof a joining surface lapped on said joining surface of said roof rail means with said sealant adhesive being interposed therebetween; and
mechanical fastening means for mechanically fastening said joining surface of said roof assembly to said joining surfaces of said roof rail means;
wherein said roof assembly comprises a roof panel which has a front end portion comprising a depending wall and a substantially horizontal flange extending outwardly from the lower end of said depending wall, said horizontal flange having an inside surface which constitutes part of said joining surface of said roof assembly; and
wherein said roof panel has another end portion, said roof assembly further comprising a retainer secured to said another end portion of said roof panel to project inwardly therefrom, said retainer having an inside surface constituting part of said joining surface of said roof assembly, said retainer being elongated and having a longitudinal end portion, said flange of said roof panel being elongated and having a longitudinal end portion to which said longitudinal end portion of said retainer is secured.

* * * * *